Feb. 15, 1966  J. MAURICE ETAL  3,235,043
HYDRAULIC TRANSMISSION

Filed April 10, 1963  6 Sheets-Sheet 1

INVENTORS
JEAN MAURICE
RAYMOND LE BRISE
BY Irwin S. Thompson
ATTORNEY

Feb. 15, 1966  J. MAURICE ETAL  3,235,043
HYDRAULIC TRANSMISSION
Filed April 10, 1963                                6 Sheets-Sheet 2
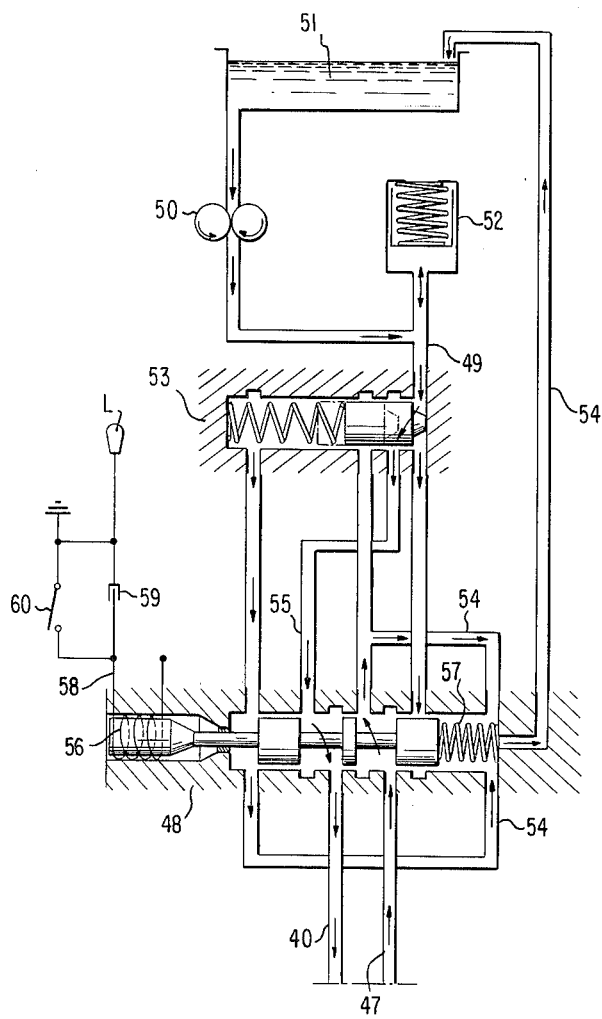
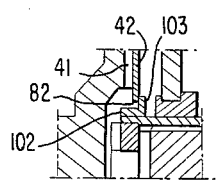
INVENTORS
JEAN MAURICE
RAYMOND LE BRISE
BY Irwin S. Thompson
ATTORNEY

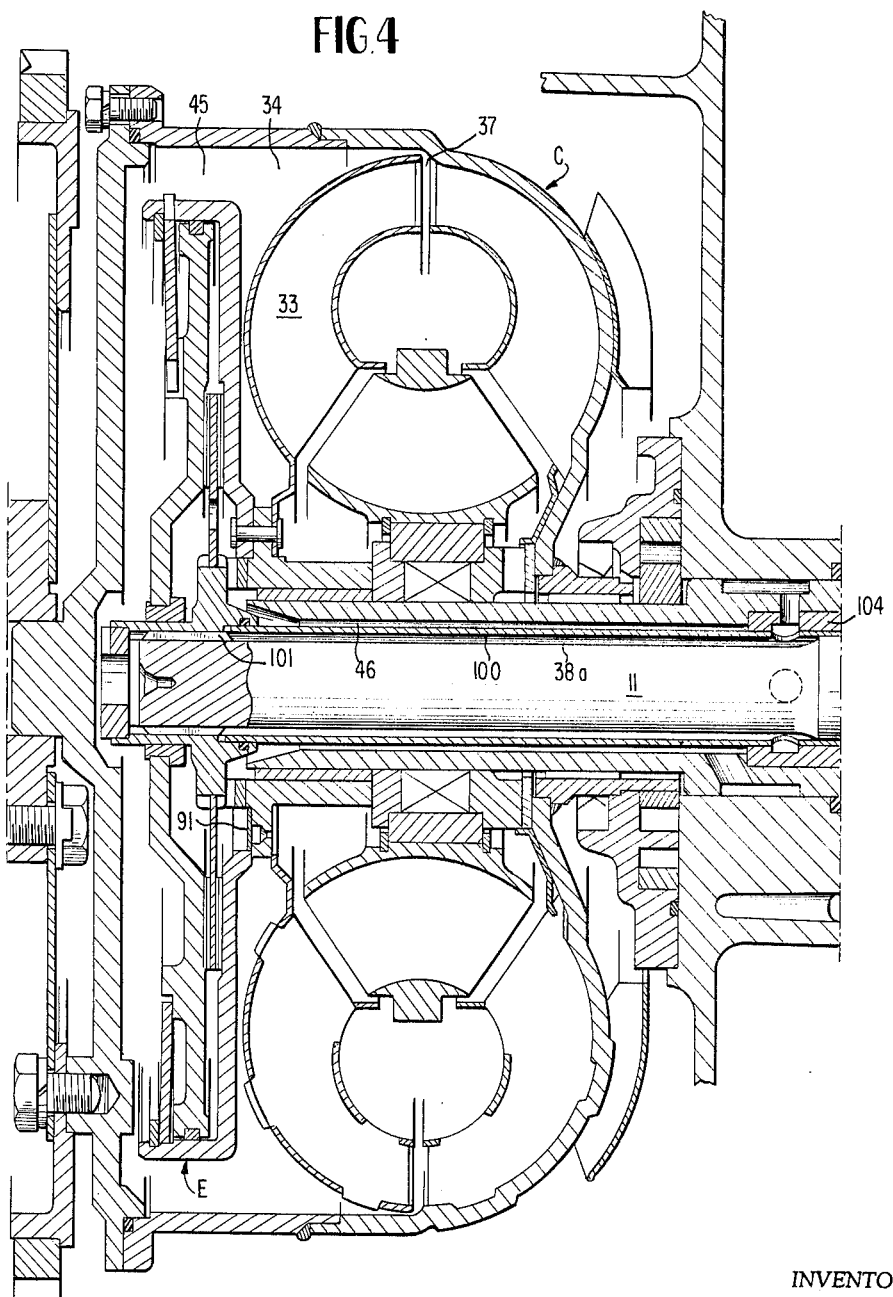

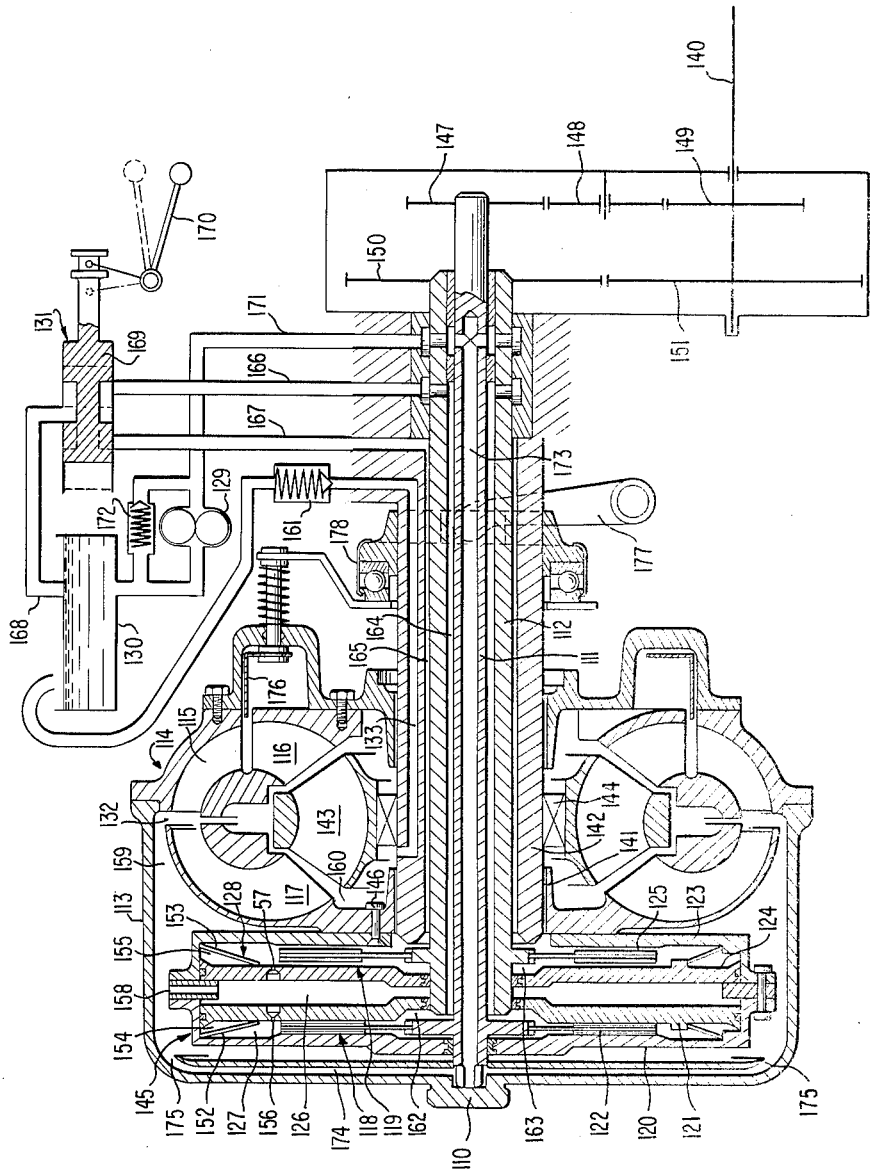

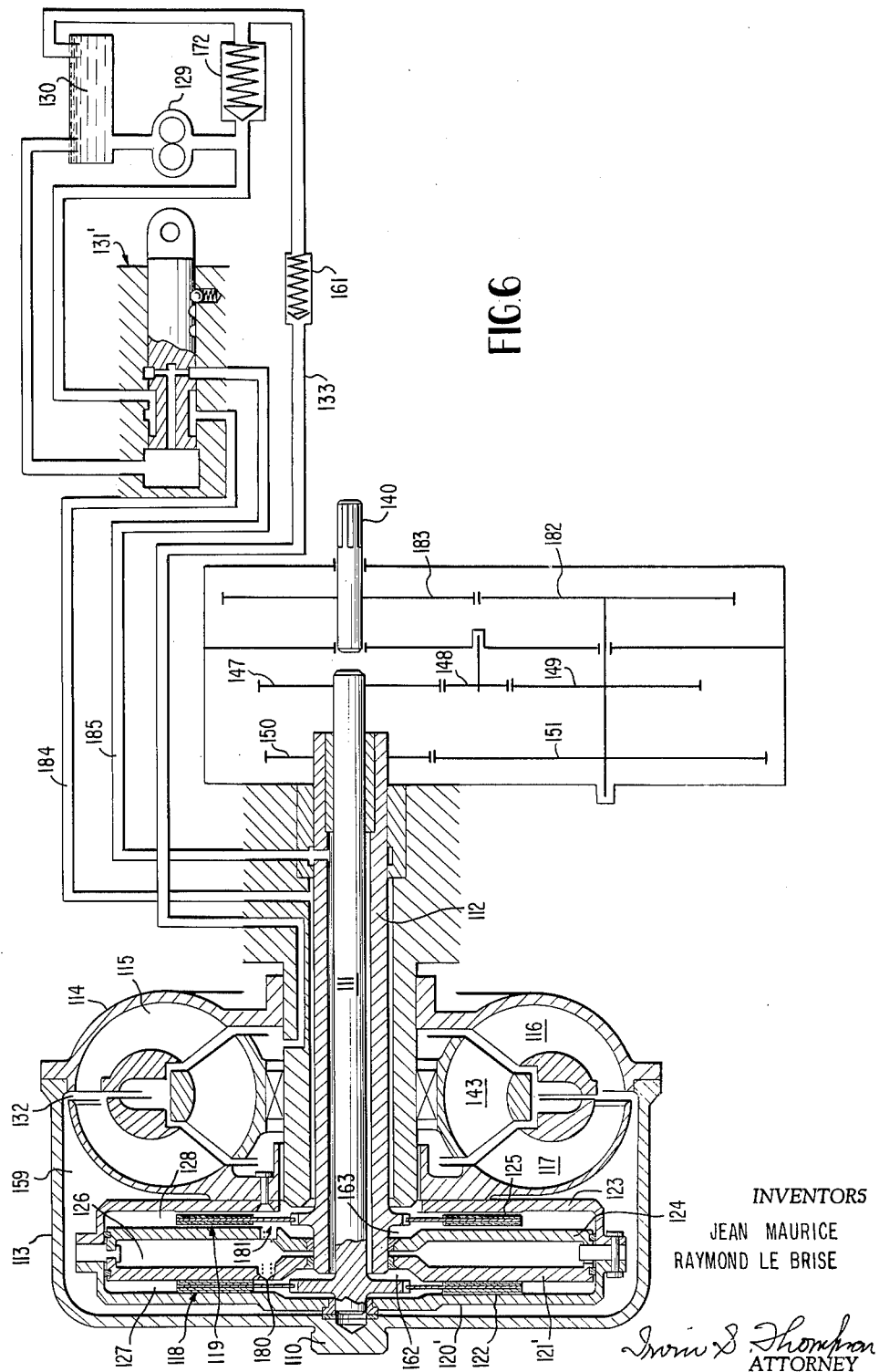

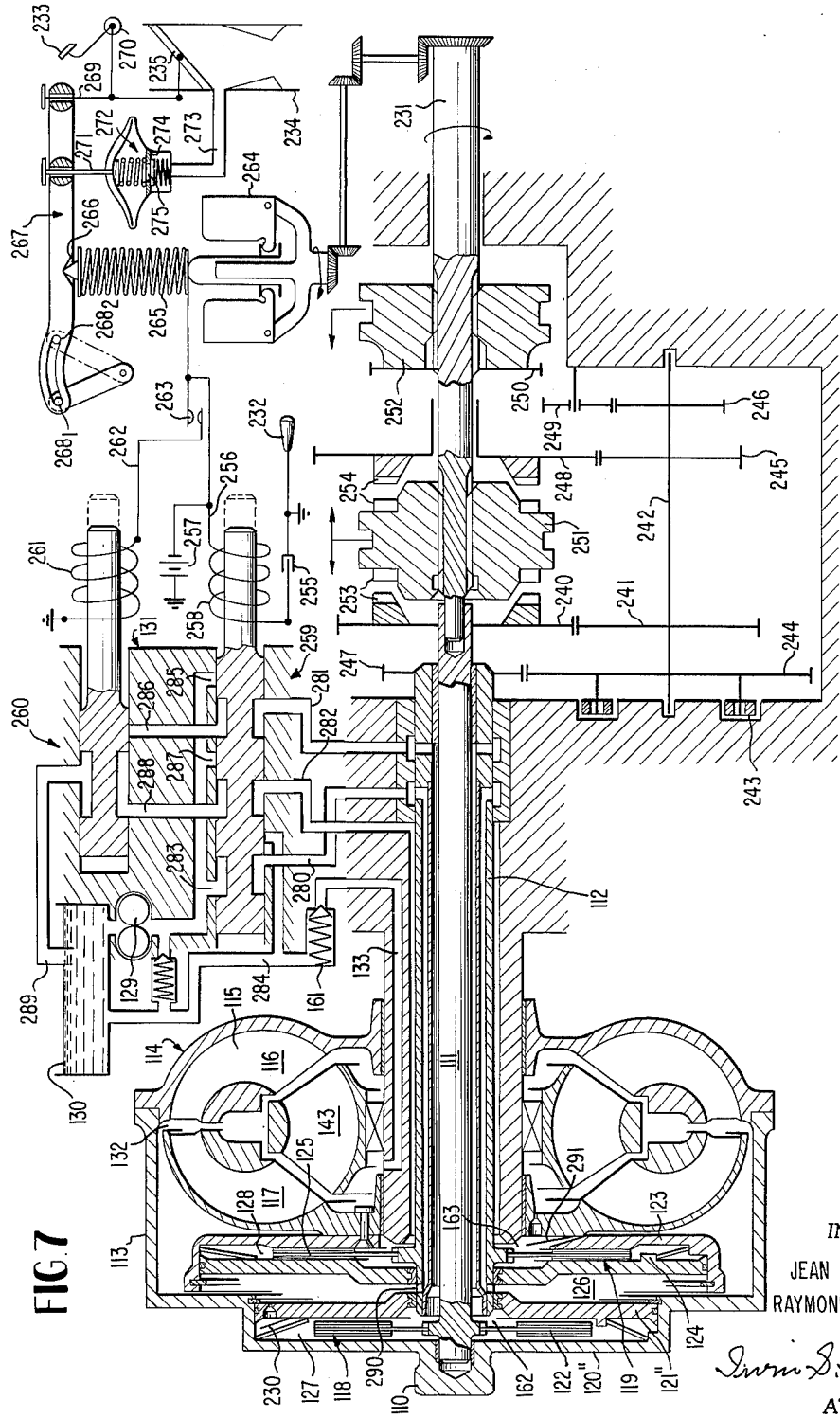

United States Patent Office 3,235,043
Patented Feb. 15, 1966

1

3,235,043
HYDRAULIC TRANSMISSION
Jean Maurice, Paris, France, and Raymond Le Brise, Saint-Denis, France, assignors to Societe Anonyme Francaise du Ferodo, Paris, France, a corporation of France
Filed Apr. 10, 1963, Ser. No. 272,020
Claims priority, application France, Apr. 13, 1962, 894,367; Nov. 22, 1962, 916,628; Mar. 15, 1963, 928,131
13 Claims. (Cl. 192—3.2)

The present invention has for its object the provision of a hydraulic transmission comprising a driving shaft and at least one driven shaft, in which a bell filled with oil under pressure and rigidly fixed to the driving shaft contains two adjacent compartments, the first of these compartments being constituted by a work circuit of a hydrokinetic coupling device (torque converter or coupler) having an impeller wheel fixed to the bell and a turbine wheel driven hydraulically by the said impeller wheel, while the second compartment contains at least one clutch having two plates fast for rotation with the said turbine wheel and a friction disc intended to be gripped by the said plates and fast for rotation with the said driven shaft, one of the said plates constituting a cylinder receiving the other plate forming a piston, one of the plates being axially fixed and the other plate being axially movable, characterized in that the said second compartment, which is divided into a clamping chamber external to the said plates and a release chamber internal to the said plates, is coupled to at least one clamping control conduit put under pressure by an oil pump so as to determine selectively the engagement of the said clutch, the said conduit comprising a portion in the vicinity of the axis and a passage which connects this portion to an access entry to the said second compartment so that the said passage by-passes the said first compartment.

This arrangement has the result, on the one hand of enabling a clamping pressure to be obtained which is defined with precision at the access entry to the second compartment, without this pressure being subjected to variations due, for example, to an oil passage in the work circuit of the hydrokinetic coupling device, and on the other hand, of preventing the oil from becoming heated by its passage through the said work circuit, thus avoiding any risk of affecting the quality of the clutch.

The invention has more particularly for its object the provision of a transmission such as defined above and comprising a single driven shaft and a single clutch, and a transmission such as defined above and comprising, in addition to the driven shaft and the clutch, a second driven shaft and a second clutch, the latter having its plates coupled for rotation either with the turbine wheel or with the impeller wheel.

The objects, particular features and advantages of the invention will furthermore be brought out in the description which follows below, of forms of construction chosen by way of example, reference being made to the accompanying drawings, in which:

FIG. 2 is a diagram of the control of this transmission;

FIGS. 3, 4, 5, 6 and 7 are views similar to that of FIG. 1, but respectively relating to various alternative forms.

Figure 1:
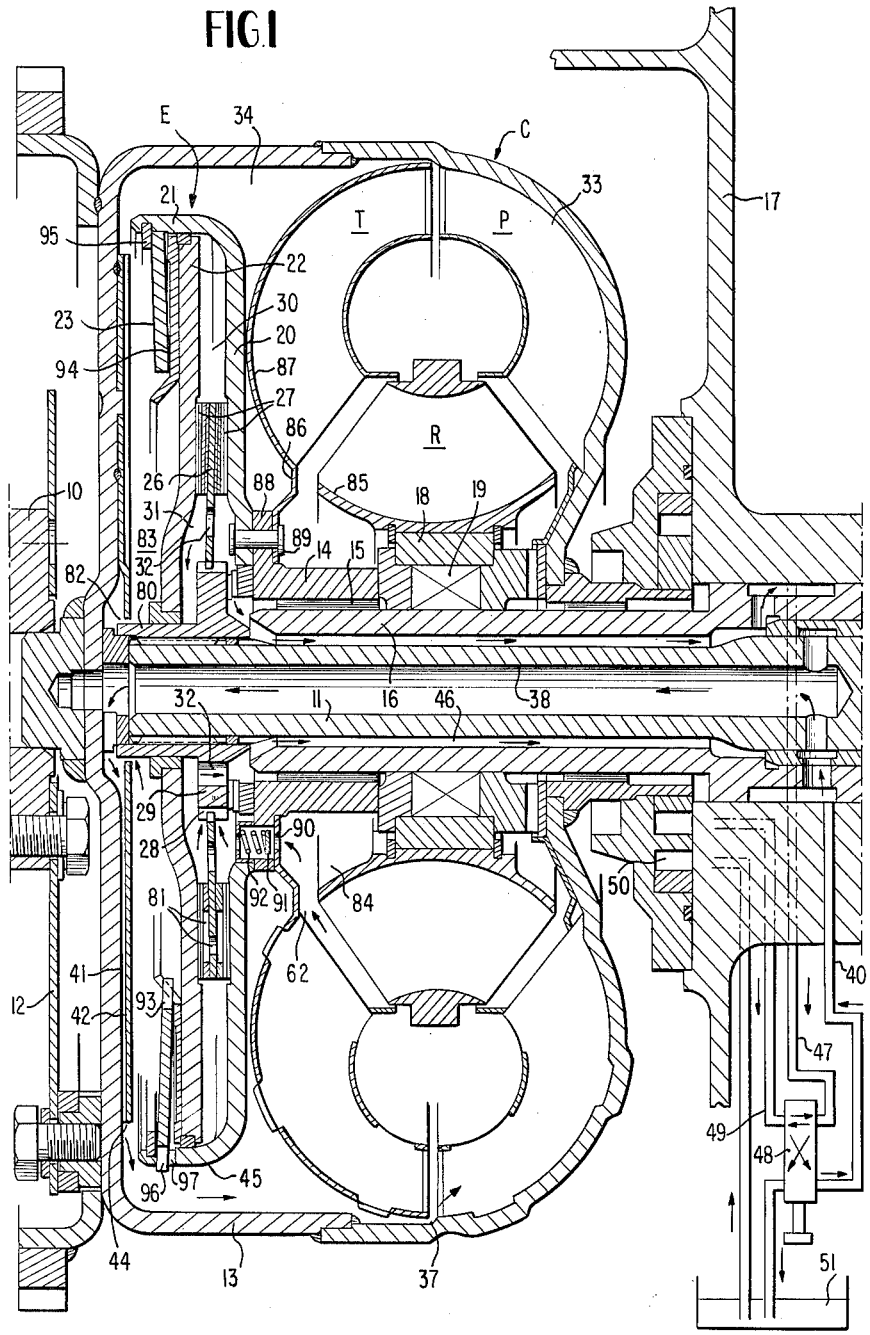
FIG. 1 is a view in longitudinal section of a transmission according to the invention.

Reference will first be made to FIG. 1, in which there is seen at 10 the driving shaft and at 11 the driven shaft of a transmission device in accordance with the invention. This device is especially intended for mounting on an automobile vehicle comprising an internal combustion engine driving the shaft 10, and a gear-box arranged after the shaft 11.

A bell 13 filled with oil under pressure and rigidly fixed to the shaft 10, contains two compartments 33 and 34 arranged alongside each other. The first compartment 33 is constituted by the work circuit of a hydrokinetic coupling device (a torque converter C in the example shown) having an impeller wheel P fixed to the bell 13 and a turbine wheel T driven hydraulically by the said impeller wheel P. The second compartment 34 contains a clutch E and is divided into an engagement chamber 83 external to the plates 20 and 22 of the clutch E, and into a disengagement chamber 30 and 31 inside the plates 20 and 22.

The plates 20 and 22 are intended to grip a friction disc 26 which is fast for rotation with the driven shaft 11. An engagement-control conduit 40 is put selectively under pressure by an oil pump 50 in order to effect the engagement of the clutch E, and comprises a portion 38 in the vicinity of the axis (formed by a bore in the shaft 11 in the example shown) and a passage 41 which couples the portion 38 to an access entry 44 into the bell 13. According to the invention, the passage 41 by-passes the first compartment 33, and the access entry 44 is arranged in the second compartment 34. In this way, the oil is not subjected to any appreciable heating before passing at 44 into the compartment 34 and there is no risk of deterioration of the quality of the friction linings 27 of the disc 26.

The bell 13 of the torque converter C is coupled by a flexible diaphragm 12 to the driving shaft 10. The impeller P is rigidly fixed to the bell 13. The turbine T is fixed to a sleeve 14 which pivots through the medium of a bearing bush 15 about a fixed sleeve 16. The latter is secured to the fixed casing 17 of the device and encloses the driven shaft 11. The reactor R is coupled to a member 18 which is prevented from rotating in the opposite direction to that of the engine by a uni-directional free-wheel coupling 19 with the said sleeve 16.

The sleeve 14 is fixed to the supporting plate 20 of the clutch E of the device. This clutch is intended to couple the turbine T with or to disconnect it from the driven shaft 11 automatically, according to the conditions of operation of the gear-box.

In a cylindrical peripheral portion 21 of the plate 20, forming a large-diameter drum, is engaged the clamping plate or piston 22, urged towards the plate 20 by a Belleville washer 23, which is addition provides the rotational coupling of the said plates.

In the example shown in FIG. 1, the washer 23 is provided along its inner contour with castellations 93 which are engaged with an annular washer 94 spot-welded on the plate 22. Along its outer contour, the washer 23 is retained by a keeper-ring 95 embedded in the cylinder 21, and is provided with castellations 96 engaged in mortices 97 of the said cylinder 21.

The friction disc 26 which carries the friction linings 27 is of small diameter and is interposed between the plates 20 and 22 so as to be gripped by them. It is mounted on splines 28 formed round a collar 29 of a hub 80, coupled to the shaft 11.

The clutch E comprises, around the periphery of the disc 26 and between the plates 20 and 22, a variable-volume chamber 30 forming a peripheral portion of the disengagement chamber 30 and 31, while it comprises, in the central space de-limited by the linings 27 and included between the plates 20 and 22, a chamber 31 also of variable volume, forming a central portion of the disengagement chamber 30, 31. Holes 32 are provided in the collar 29 and in the disc 26, so that the whole of the chamber 31 forms a single space. The peripheral chamber 30 communicates solely with the chamber 31 by appropriate passage means 81 formed preferably in the whole of the disc 26 and the linings 27, and preferably having an orientated pressure drop which is higher in the direction 30, 31 than in the opposite direction, so as to permit of progressive engagements and instantaneous releases of the clutch.

The engagement chamber 83 is supplied with oil under pressure from the conduit 38 which is formed inside the shaft 11. The conduit 38 communicates with a series of channels 41 arranged in the shape of a fan and having a small pressure loss. Each channel may be produced by the application of a ribbed plate 42 on the bell 13. Each channel 41 opens at 44 on the periphery of the engagement chamber 83. The oil flowing in the conduit 38 is thus distributed at the periphery of the chamber 83. The plate 42 surrounds the hub 80 in a free manner, being separated from the said hub 80 by a small annular space 82.

This arrangement has several advantages. It avoids any adjustment which is liable to be awkward between two members centered by different means along the same axis. In addition, it ensures a circulation of oil through the space 82. This circulation results from the fact that the pressure in chamber 83 adjacent space 82 is higher than the pressure in channels 41 adjacent space 82. This differential pressure results from the following facts: adjacent the outer periphery of plate 42, the channels 41 and chamber 83 are at about the same pressure because they are in free communication with each other. But the turbine, and with it the plate 22, rotates slower than plate 42. Therefore, the average or mean speed of rotation of the liquid in chamber 83 is less than that of the liquid in channels 41. That portion of the pressure of these liquids which is due to centrifugal force, however, varies in proportion to the square of the speed of rotation of the liquid and the square of the distance from the axis of rotation. As the liquid in channels 41 rotates faster than that in chamber 83, the pressure drop in channels 41, as one moves towards the axis of rotation, is substantially greater than in chamber 83. As a result, the pressure on opposite sides of space 82 will be distinctively different, and liquid will tend to flow from chamber 83 through space 82 toward channels 41. Such a circulation through the space 82 ensures a renewal of the oil in the chamber 83, while accentuating the cooling of the clutch E and avoiding any undesirable dead-end effect. The space 82 has furthermore the result of accelerating the return of the oil towards the conduit 38 at the moment of disengagement.

The work circuit 33 of the converter C is supplied with oil from the outlet 44 of the channels 41 through the intermediary of the peripheral space 45 provided between the clutch E and the bell 13, and through the intermediary of the space 37 between the impeller P and the turbine T. Irrespective of the conditions of utilization, the pressure in the circuit 33 is determined by the pressure existing at the periphery of the compartment 34.

The oil is allowed to pass out of the work circuit 33 through the space 62 between the turbine T and the reactor R, and passes into a chamber 84 which is delimited by the outer wall 85 of the reactor R, the sleeve 14, and an annular central extension 86 of the outer wall 87 of the turbine T.

As can be seen from FIG. 1, the extension 86 and the plate 20 are disposed on each side of a collar 88 of the sleeve 14 and are fixed to it by uniformly-spaced ordinary rivets 89. The chamber 84 communicates with the chamber 31 by passages 90 which are formed in the extension 86, the collar 88 and the plate 20, and which are disposed alternately with the rivets 89. Each passage 90 is provided with a one-way valve 91 having a helicoidal spring 92, in such manner that the oil may pass from the chamber 84 to the chamber 31, while all circulation in the reverse direction is prevented. The chamber 31 communicates with a space 46 formed between the shaft 11 and the sleeve 16.

The passage 38 and the space 46 are respectively coupled to a distributor 48 by the conduit 40 and another conduit 47. The distributor 48 is supplied with oil under pressure by a conduit 49 which is coupled to the pump 50 taking its suction from a tank 51. The pump 50 is preferably arranged in proximity to the impeller P and is driven by the said impeller.

The distributor 48 consists for example of an electro-valve, as shown in FIG. 2, to which reference will now be made. The electro-valve 48 is supplied with oil under pressure through the conduit 49 which is connected to the pump 50, taking its supply from the tank 51. The conduit 49 is further connected to a pressure accumulator 52 and a discharge valve 53. The return of the various leakages to the tank 51 is effected by a number of conduits 54.

The discharge valve 53 may occupy different positions. In the position shown, the valve interrupts the communication of the pump 50 with the conduit 40 and reserves all its output for putting the accumulator 52 under pressure. In an intermediate position, reached after the accumulator 52 has been filled, the valve 53 delivers through an arm 55 into the conduit 40. In its extreme position, the valve 53 permits the return of oil to the tank 51 in the event of excessive pressure.

The electro-valve 48 is actuated by an electro-magnet 56 and by an opposing spring 57. The supply circuit 58 of the electro-magnet 56 comprises two switches in parallel: one switch 59 is actuated by the gear-changing lever L, while the other switch 60 is responsive to the neutral position of the gear-box. The switch 59 is closed whenever the user seizes the gear-changing lever, and it is opened whenever the lever L is released by the user. The switch 60 is closed in the neutral position and is opened when a gear is engaged.

When a gear is engaged in the gear-box, the electro-valve 48 occupies a position such that the conduit 49 communicates with the conduit 40, while the conduit 47 is coupled to the tank 51. Oil under pressure in the conduit 40 (FIG. 1) supplies the passage 38, the channels 41, the space 34, 83 and the work circuit 33. As it passes through the valves 91, the oil suffers a considerable loss of pressure and returns to the tank 51 through the conduits 46 and 47. In consequence of the preponderant pressure in the chamber 34, 83 with respect to the pressure at 31 and 30, the clutch is held engaged.

It will be observed that the oil circulating in the work circuit 33 of the converter is renewed by a flow of cooled oil coming from the outlet 44, while a corresponding flow of hot oil is permitted to pass out through the valves 91. Alternatively, the oil coming from the outlet 44 could be evacuated solely through the disengagement chamber 30, 31, without passing through the work circuit 33, or again it could be evacuated through the work circuit 33 without passing through the disengagement chamber 30, 31.

When the gear-box is in the neutral position, or when the gear-changing lever is actuated, the oil under pressure at 49 supplies the conduits 47 and 46, which initiates a preponderant pressure in the chamber 31 and the chamber 30, while the valves 91 are closed. The clutch becomes disengaged.

In an alternative form (FIG. 3), the arrangement is similar to that which has just been described with reference to FIG. 1, but the space 82 is closed by a shouldered ring 102 having a supporting ledge 103 located in the chamber 83 and forced into axial abutment with the plate 42 by the pressure at 83 which is higher than at the entrance of the channels 41. The ring 102 is preferably given play with respect to the central bore of the plate 42 in order to compensate for any possible errors of concentricity.

In the alternative form shown in FIG. 4, the portion 38 does not consist of a central bore formed in the shaft 11, but of a space 38a formed round the shaft 11 and delimited externally by a cylindrical sheath 100 serving as a bearing bush for a drilled bearing 104. The space 38a communicates with the compartment 34 through the intermediary of the spline coupling 101 between the hub 80 and the shaft 11, by virtue of the suppression of one or more splines. It should be noted that the passage 46 is in this case comprised between the cylindrical sheath 100 and the sleeve 16.

In addition, the plate 42 with the channels 41 is eliminated, and the oil circulation proceeding from the passage 38a and the splines 101 passes wholly between the bell 13 and the plate 22 so as to reach the periphery 45 of the chamber 44 before passing at 37 into the work circuit 33 of the converter C. It will be noted that this arrangement necessitates a higher pressure from the pump 50 so as to obtain at 34 the same pressure as previously, since the increase of dynamic pressure due to centrifugal force is produced, not by the speed of the impeller, but by a speed which is intermediate between the speed of the impeller and the speed of the turbine.

Reference will now be made to FIG. 5, in which the transmission comprises a driving shaft 110 and two driven shafts 111 and 112. A bell 113 filled with oil under pressure and rigidly fixed to the driving shaft 110 contains a hydro-kinetic coupling device constituted, in the example of FIG. 5, by a hydraulic torque converter 114. The work circuit 115 of the converter 114 comprises at least one impeller wheel 116 rigidly fixed to the bell 113, and a turbine wheel 117 driven hydraulically by the impeller wheel 116. The bell 113 contains in addition two clutches 118 and 119.

The first clutch 118 comprises a plate 120 which is axially fixed and which forms a cylinder receiving another plate 121 axially movable and forming a piston. The plates 120 and 121 are fast for rotation with the wheel 117. The plates 120 and 121 are intended to grip a friction disc 122 which is fixed for rotation with the first driven shaft 111.

The second clutch 119, the construction of which is similar to that of the first clutch 118, comprises a plate 123 which is axially fixed and which forms a cylinder receiving another plate 124, axially movable and forming a piston. The plates 123 and 124 are fixed for rotation with the turbine wheel 117 and are intended to grip a friction disc 125 which is fast for rotation with the second driven shaft 112.

The bell 113 contains a common engagement chamber 126 externally adjacent to the axially-movable plates 121 and 124 of the clutches 118 and 119, a first individual disengagement chamber 127 formed between the plates 120 and 121 of the first clutch 118, and a second individual disengagement chamber 128 formed between the plates 123 and 124 of the second clutch 119.

Oil-circulation means, comprising an oil pump 129 and a tank 130 co-operate with the three chambers 126, 127 and 128, and are associated with a control 131 which establishes at will an order of precedence in the pressure effects in each of the individual chambers 127 and 128, and in the common chambmer 126, so as to actuate selectively the clutches 118 and 119.

The common chamber 126 in which the oil is supplied by the oil pump 129, comprises an oil outlet 132 communicating with the work circuit 115 of the torque-converter 114 for the purpose of cooling the converter, while an oil-return 133 is arranged between the work circuit 115 and the tank 130.

FIG. 5 relates by way of example to an application of the invention to a transmission for a handling truck.

The driving shaft 110 is fixed to the bell 113 of the hydraulic torque converter 114, the impeller 116 of which is fixed to the bell 113, the turbine 117 being rotatably mounted at 141 to pivot about a fixed sleeve 142, the reactor 143 being connected to the sleeve 142 by a free-wheel 144.

A drum 145 is arranged inside the bell 113 and is fixed at 146 to the turbine 117. It is the opposite flat walls 120 and 123 of the drum 145 which form the axial supporting plates for the two clutches 118 and 119.

The driven shaft 111, rigidly fixed for rotation with the disc 122, carries a pinion 147 which engages with a reversing pinion 148 engaging in its turn with a pinion 149 fixed on the output shaft 140 of the truck, while the driven shaft 112, fast for rotation with the disc 125, carries a pinion 150 which engages with a pinion 151 fixed on the said output shaft 140 so that when the said shaft 140 rotates, the shafts 111 and 112 rotate in opposite directions to each other.

The control of the clutches 118 and 119 is hydraulic and is completed by Belleville washers 152 and 153, which tend to keep the clutches 118 and 119 disengaged. In the example shown, each washer 152 and 153 forms in addition a rotational coupling means for the pressure-plate 121, 124 with the support plate 120, 123 of the drum 145.

As regards the hydraulic control, each clutch 118, 119 comprises a peripheral portion 154, 155 of the individual chamber 127, 128, formed between the plates 120 and 121, 123 and 124, on the outer side of the discs 122, 125. The individual peripheral portion 154, 155 communicates by a calibrated orifice 156, 157 with the common chamber 126, which in turn communicates by large orifices 158 with the peripheral portion 159 of the bell 113.

The peripheral portion 159 communicates with the work circuit 115 of the converter 114 through the space 132 formed between the impeller 116 and the turbine 117. The circuit 115 is coupled by the space 160 formed between the turbine 117 and the reactor 143 with the reactor conduit 133 on which is provided a calibrated valve 161.

Each clutch 118, 119 further comprises a central portion 162, 163 of the individual chamber 127, 128, which is formed between the plates 120 and 121, 123 and 125, on the side internal to the linings of the disc 122, 125. The central portions 162, 163 communicate respectively by the spaces 164 and 165, the space 164 being formed between the shafts 111 and 112, and the other 165 between the shaft 112 and the sleeve 142 with conduits 166, 167. The two conduits 166 and 167 are coupled to the control 131 which is constituted by a valve connected to the tank 130 by a conduit 168.

The slide-valve 169 of the valve 131 is actuated by a lever 170 and is movably mounted between three positions: a position for forward running (shown in chain-dotted lines in FIG. 5) in which the conduit 166 is closed by the slide-valve 169, while the conduit 167 communicates with the conduit 168 for discharge to the tank 130; a reverse-running position (shown in full lines in FIG. 5) in which the conduit 166 communicates with the conduit 168, while the conduit 167 is closed by the slide-valve 169; and a neutral or dead-centre position in which the two conduits 166 and 167 are closed by the slide-valve 169.

The pump 129 which takes its suction from the tank 130 delivers into a conduit 171 and is associated with a discharge valve 172 forming a pressure-limiting device in the conduit 171. This conduit 171 communicates with a longitudinal bore 173 drilled in the shaft 111 and supplying a passage 174. This passage passes radially along the bell 113 and opens out at 175 into the peripheral portion 159 of the chamber 126.

It will be noted that the work circuit 115 of the converter 113 is constantly traversed by a flow of oil under pressure following the path: 129–171–173–174–159–132–115–160–133–161–130. Thus, the work circuit is cooled and it should be observed that the hot oil passing out of this circuit returns directly to the tank 130 in which it can cool down before being sent to the assembly of the two clutches 118 and 119.

The clutch 118 or 119 is engaged when the conduit 167 or 166 communicates with the conduit 168, and it is disengaged when the conduit 167 or 166 is closed by the slide-valve 169. The engagement of the clutch 118 causes the shaft 140 to be driven by the shaft 111 and the pinions 147, 148, 149, which corresponds to reverse running. Engagement of the clutch 119 causes the shaft 140 to be driven by the shaft 112 and the pinions 150 and 151, which corresponds to forward running.

In more detail, when the lever 170 is put into the reverse runing position (shown in full lines in FIG. 5), the conduit 166 is put to discharge while the conduit 167 is closed. In the chamber of the clutch 118 which is engaged, the pressure is zero in the vicinity of the axis and, as the distance from the axis increases, this pressure follows a progressive change (to the nearest constant) identical with the progression of the pressures in the chamber 126. The gripping action is therefore uniform along the control piston 121 and is produced by a pressure close to that delivered by the pump 129. In the chamber of the clutch 119 there is no circulation; the pressures are squal on both sides of the piston 124 on each side of the orifice 157, and the liquid of the chamber of the clutch 119 is practically motionless between the centre and the maximum radius of the disc 124 because of the opposite speeds of rotation of the plates 123, 124 and of the disc 125 which, in the example shown, are equal, the ratios of the forward and reverse gears being identical. The pressure is therefore constant in the interior of the chamber of the clutch 119, which develops a force in the direction of disengagement. This force is increased by the action of the elastic washer 153. The operation is symmetrical with that of the preceding in the case of forward running.

In the example shown in FIG. 5, the work circuit 115 of the converter 114 can be closed at will by a shutter 176 operated from the exterior in order to vary the torque absorption of the impeller 116 of the converter 114, that is to say the torque delivered by the turbine 117 for a pre-determined speed of the impeller 116.

The actuation of the shutter 176 shown in FIG. 5 is mechanical, and comprises a fork 177 and a stop 178 similar to the fork and stop of mechanical clutches. The actuation of the shutter 76 may be effected conjointly with the brake pedal.

Reference will now be made to FIG. 6 in which the arrangement is similar to that which has just been described with reference to FIG. 5, but in which the oil arriving under pressure from the pump 129 is not directly admitted to the peripheral portion 159 of the common chamber 126, but is admitted either to the individual chamber 127 for the purposes of forward running, or to the individual chamber 128 for reverse running, or into both the chambers 127 and 128 for the neutral position. The orifices 156 and 157 are eliminated and are replaced by calibrated valves 180 and 181, located at the level of the central chambers 162 and 163 and intended to supply the common chamber 126.

In the device shown in FIG. 6, the valve 176 is eliminated. In addition, the output shaft 140 is made coaxial with the shafts 110, 111 and 112, and is driven through the intermediary of two additional pinions 182 and 183.

The control 131′ consists of a distributor with three positions, forward running, neutral and reverse. In the forward running position shown in FIG. 6, the oil delivered by the pump 129 and passing through the distributor 131′, passes into the conduit 184 which serves the central chamber 163 of the clutch 119. The latter is disengaged and the oil passes over the valve 181 and is admitted to the common chamber 126. The valve 180 closes and the clutch 118 becomes engaged. The oil in the individual chamber 127 of the clutch 118 is expelled through the conduit 185 into the distributor 131′ and to the tank 130.

In the reverse running position, the operation is reversed. The conduit 184 plays the part of the conduit 185 and vice-versa. The clutch 118 is disengaged and the clutch 119 is engaged. At the neutral point, the two conduits 184 and 185 are put under pressure and the two clutches 118 and 119 are disengaged. In all three cases, the oil admitted to the common chamber 126 passes into the peripheral portion 159 of this chamber and passes at 132 into the work circuit 115 of the converter 114. As in the previous case, the return to the tank 130 is effected by the conduit 133 having the valve 161.

The pump 129 is provided with a sufficient power so that in the event of stalling of the turbine 117 and the immobilization of the clutch plates 118 and 119, the oil pressure at 126 and 159 is sufficient to overcome the centrifugal effects due to the impeller 116 acting as a pump, and that the circulation of oil is always effected under normal conditions in the direction: 126–159–132–115–133–161–130.

Reference will now be made to FIG. 7 which relates to an application of the invention to a hydraulic transmission of an automobile vehicle.

The plates 120″ and 121″ of the clutch 118 are fast for rotation with the driving assembly 110–113–116. The plate 121″ is provided with a one-way valve 230 opening in the direction going towards the individual chamber 127 from the common chamber 126.

The first driven shaft 111 is rigidly fixed to a pinion 240 which engages with a pinion 241 fixed on a countershaft 242. The latter is associated with a brake 243 which is controlled by centrifugal force so as to be released when the shaft 242 rotates at a speed higher than a pre-determined value, and to be applied when the shaft 242 rotates at a speed less than the said pre-determined value. This value corresponds to a speed of the vehicle of a few kilometres per hour.

The shaft 242 also carries three other pinions 244, 245 and 246. The pinion 244 engages with a pinion 247 rigidly fixed on the second driven shaft 112. The pinion 245 which is smaller than the pinion 241, engages with a pinion 248 which is larger than the pinion 240 and which is mounted freely rotatable on the output shaft 231. The pinion 246 engages with a reversing pinion 249 which is intended to engage at will with a pinion 250 fast for rotation with the shaft 231.

The whole of this system of pinions is contained in a gear-box which comprises two sliding gears 251 and 252 mounted on splines on the shaft 231 and operated by a gear-changing lever 232. The sliding gear 251 can be engaged at will at 253 with the pinion 240, or at 254 with the pinion 248, while the sliding gear 252 which carries the pinion 250 can be operated at will so that the said pinion 250 engages with the pinion 249.

Under the control of the lever 232, the gear-box can thus be put, irrespective of the input shaft, into: a neutral or dead-centre position in which the sliding gears 251 and 252 are disengaged from the teeth 253, 254, and 249; a position of high forward gear in which the sliding gear 251 is engaged at 253 with the pinion 240; a position of low forward gear in which the sliding gear 251 is engaged at 254 with the pinion 248; and a reverse-running position in which the sliding gear 252 is operated in such manner that the pinions 249 and 250 engage.

The lever 232 is of the "broken" type, incorporating an electric switch 255 which is open when the lever 232 is left free and which is closed when the lever 232 is seized and operated by the user. The switch 255 is connected in the earth return of an electric circuit 256 comprising a source of current 257 formed for example by the battery of the vehicle, and a solenoid 258 controlling an electro-valve 259 forming part of the control 131.

A second electro-valve 260 also forming part of the control 131 is operated by a solenoid 261 supplied from the battery 257 by a circuit 262 comprising a switch 263. This switch is operated by a centrifugal governor 264 driven at a speed proportional to the speed of the output shaft 231, so that the switch 263 is open when the speed of the shaft 231 is sufficiently low, and so that it is closed when the speed of this shaft is sufficiently high. To the centrifugal action of the governor 264 which tends to close the switch 263, there is opposed the elastic action of a spring 265, the strength of which is variable as a function of working factors such as the degree of travel of the accelerator pedal 233, the depression in the admission pipe 234, the position of the sliding gears 251 and 252. More particularly, the force applied by the spring 265 becomes greater as the accelerator pedal is pushed farther down and as the depression in the pipe 234 becomes greater, and this with a greater magnitude in high gear than in low gear or in reverse.

The spring 265 is supported at 266 on a lever 267, the pivot of which has a position controlled in dependence on the position of the gears, being located at $268_1$ in high gear and at $268_2$ in low gear or reverse gear, the position $268_1$ being further from the support point 266 than the position $268_2$. At its other extremity, the lever is connected on the one hand by a rod 269 to the rod system 270 which couples the pedal 233 to the butterfly-valve 235, and on the other hand by a rod 271 to a capsule 272 which is connected to the admission pipe 234 by a conduit 273 comprising a valve 274 having a calibrated orifice 275 such that the depression acts without delay while the filling is retarded.

The electro-valves 259 and 260 of the control 131 are arranged in a hydraulic circuit which actuates the clutches 118 and 119 and which supplies the work circuit 115 of the converter 114.

Three utilization conduits 280, 281 and 282 are connected to the electro-valve 259. The conduit 280 can be associated on the one hand with a supply conduit 283 coupled to the pump 129, and on the other hand to a return conduit 284 coupled to the reservoir 130. The conduit 281 can be associated on the one hand with a supply conduit 285 coupled to the pump 129 and on the other hand to a return conduit 286. The conduit 282 can be associated on the one hand to a supply conduit 287 coupled to the pump 129 and on the other hand to a return conduit 288. The conduits 286 and 288 are connected to the electro-valve 260, which is connected to a conduit 289 returning to the tank 130.

In the de-energized position of the electro-valve 259 (such as that shown in full lines in FIG. 7), the pump 129 supplies the conduit 280, the conduit 281 is connected to the conduit 286 and the conduit 282 is coupled to the conduit 288. In the excitation position of the electro-valve 259 (shown in dotted-lines), the conduit 280 is connected to the conduit 284 and the pump 129 supplies the conduits 281 and 282.

In the de-energized position of the electro-valve 260 (that shown in full lines in FIG. 7), the conduit 288 is connected to the conduit 289 and the conduit 286 is closed. In the excitation position of the electro-valve 260 (shown in dotted lines), the conduit 286 is connected to the conduit 289 and the conduit 288 is closed.

The conduit 280 is coupled at 290 to the centre of the common chamber 126 of the clutches 118 and 119. The peripheral portion 159 of the chamber 126 supplies at 132 the work circuit 115 of the converter 114. The circuit 115 sends the oil to the tank 130, not only through the conduit 133 provided with the valve 161, but also through a valve 291 which serves the central chamber 163 of the clutch 119, which is connected to the conduit 282. The conduit 133 may be eliminated when so desired. As regards the central chamber 162 of the clutch 118, this is connected to the conduit 281.

As long as the user does not touch the lever 232, the switch 255 is open and the solenoid 258 is de-energized. The electro-valve 259 is in the position shown in FIG. 7. At a sufficiently low speed of the vehicle, corrected by the above-mentioned working factors, the switch 263 is open and the electro-valve 260 also occupies the position shown in FIG. 7. The oil delivered by the pump 129 reaches the conduit 280 and passes into the common chamber 126 to cause the engagement of the clutch 119, the chamber 128 of which receives the oil with a large drop in pressure at 291, and is connected to the tank 130 through the conduit 282, while the clutch 118 is disengaged, its chamber 127 having its communication to the tank 130 interrupted by the electro-valve 260. The pressures are balanced on each side of the valve 230.

There is thus established a hydraulic phase on the lowest gear of the range engaged, in which the shaft 231 is driven from the driving shaft 110 through the intermediary of the converter 114. At a sufficiently high speed of the vehicle, corrected in accordance with the above-mentioned working factors, the switch 263 is closed and the electro-valve 261 takes up the dotted-line position, displaced towards the right as compared with the previous position. The oil delivered by the pump 129 into the common chamber 126 causes the engagement of the clutch 118, the chamber 127 of which is connected to the tank 130 by the conduit 281, while the clutch 119 is disengaged, its chamber 128 having its communication with the tank 130 interrupted by the electro-valve 260.

When the user actuates the lever 232 in order to modify the position of the sliding gear 251 or of the gear 252, the switch 255 becomes closed and the electro-valve 259 takes up the position in dotted-lines displaced towards the right with respect to that shown in full lines. The oil delivered by the pump 129 passes simultaneously through the conduits 281 and 282 to the individual chambers 127 and 128 of the clutches 118 and 119, which disengages these clutches and permits the gear ratio to be changed. When the user releases the lever 232 after this operation, one or the other of the clutches 118 or 119 becomes engaged, depending on whether the switch 263 is closed or open. This engagement takes place with a suitable progression of operation.

What we claim is:

1. A hydraulic transmission comprising a driving shaft and at least one driven shaft, means defining a working chamber and a clutch chamber, impeller means in the working chamber fixed for rotation with the driving shaft, clutch means in the clutch chamber comprising at least a pair of plates disposed in cylinder and piston relationship, one of said plates being mounted for axial sliding movement relative to the other of said plates, friction disc means disposed between said plates and fixed for rotation with said driven shaft, turbine means in said working chamber fixed for rotation with said clutch means, at least one of the inner walls of said clutch chamber being in unitary assembly with the driving shaft, pump means having an outlet for supplying liquid under pressure to the transmission, and conduit means communicating between said pump outlet and that portion of the interior of the clutch chamber which is adjacent to said wall of the clutch chamber and bypassing said working chamber, whereby liquid is delivered from the pump to the clutch chamber in bypass relationship with the working chamber.

2. A transmission as claimed in claim 1, in which said conduit means discharges liquid into the clutch chamber adjacent the periphery of the clutch chamber.

3. A hydraulic transmission as claimed in claim 2, in which at least a portion of said conduit means is fixed for rotation with said driving shaft whereby the pump pressure is augmented by the centrifugal pressure imparted to the liquid by said wall.

4. A hydraulic transmission as claimed in claim 1, in which at least a portion of said conduit means is fixed for rotation with the driving shaft.

5. A hydraulic transmission as claimed in claim 4, in which at least a portion of said conduit means comprises a plurality of radially outwardly extending channels fixed for rotation with the driving shaft.

6. A hydraulic transmission as claimed in claim 5, in which said channels communicate adjacent their radially inner ends with the clutch chamber thereby to induce the flow of liquid from the clutch chamber into said channels.

7. A hydraulic transmission as claimed in claim 2, in which said at least a portion of said conduit means communicates with the clutch chamber adjacent the axis of rotation, thereby to induce the flow of liquid from the clutch chamber into said at least a portion of said conduit means.

8. A hydraulic transmission as claimed in claim 1, in which said conduit means communicates with a radially inner portion of said clutch chamber.

9. A hydraulic transmission as claimed in claim 1, and a second driven shaft, said clutch means further including a second pair of plates in cylinder and piston relation with each other and fixed for rotation with said turbine means and a friction disc between said second plates and fixed for rotation with said second driven shaft, said clutch chamber including an engagement chamber common to the two pairs of plates and external to said plates.

10. A hydraulic transmission as claimed in claim 9, and means for selectively alternately directing liquid from the pump outlet to said engagement chamber and to the inside of said clutch means.

11. A hydraulic transmission as claimed in claim 1, and means for selectively alternately directing liquid from the pump outlet to the outside of said clutch means and to the inside of said clutch means.

12. A hydraulic transmission comprising a driving shaft and at least one driven shaft, means defining a working chamber and a clutch chamber, impeller means in the working chamber fixed for rotation with the driving shaft, clutch means in the clutch chamber comprising at least a pair of plates disposed in cylinder and piston relationship, one of said plates being mounted for axial sliding movement relative to the other of said plates, friction disc means disposed between said plates and fixed for rotation with said driven shaft, turbine means in said working chamber fixed for rotation with said clutch means, at least one of the inner walls of said clutch chamber being in unitary assembly with the driving shaft, pump means having an outlet for supplying liquid under pressure to the transmission, and conduit means communicating between said pump outlet and the interior of the clutch chamber and bypassing said working chamber, whereby liquid is delivered from the pump to the clutch chamber in bypass relationship with the working chamber.

13. A hydraulic transmission comprising a driving shaft and at least one driven shaft, means defining a working chamber and a clutch chamber, impeller means in the working chamber fixed for rotation with the driving shaft, clutch means in the clutch chamber comprising at least a pair of plates disposed in cylinder and piston relationship, one of said plates being mounted for axial sliding movement relative to the other of said plates, friction disc means disposed between said plates and fixed for rotation with said driven shaft, turbine means in said working chamber fixed for rotation with said clutch means, at least one of the inner walls of said clutch chamber being in unitary assembly with the driving shaft, pump means having an outlet for supplying liquid under pressure to the transmission, and conduit means communicating between said pump outlet and at least one portion of the interior of the clutch chamber, and bypassing said working chamber, whereby liquid is delivered from the pump to the clutch chamber in bypass relationship with the working chamber.

References Cited by the Examiner
UNITED STATES PATENTS

| | | | |
|---|---|---|---|
| 2,301,957 | 11/1942 | Lang | 192—3.2 |
| 2,607,456 | 8/1952 | Jandasek | 60—54 |
| 2,717,673 | 9/1955 | Zeidler | 60—54 |
| 2,736,407 | 2/1956 | Smirl | 192—3.2 |
| 2,737,824 | 3/1956 | Livermore | 192—87 |
| 2,750,017 | 6/1956 | Ahlen | 192—87 |
| 3,032,157 | 5/1962 | Richards | 192—87 |
| 3,073,183 | 1/1963 | Kelley | 192—3.2 |

FOREIGN PATENTS

| | | |
|---|---|---|
| 1,258,842 | 3/1961 | France. |
| 932,698 | 7/1963 | Great Britain. |

DON A. WAITE, *Primary Examiner.*
DAVID J. WILLIAMOWSKY, *Examiner.*